US011710430B1

(12) United States Patent
Wray

(10) Patent No.: US 11,710,430 B1
(45) Date of Patent: Jul. 25, 2023

(54) VIRTUAL FISH TANK ASSEMBLY

(71) Applicant: Reginald Wray, Denver, CO (US)

(72) Inventor: Reginald Wray, Denver, CO (US)

( * ) Notice: Subject to any disclaimer, the term of this patent is extended or adjusted under 35 U.S.C. 154(b) by 0 days.

(21) Appl. No.: 17/701,851

(22) Filed: Mar. 23, 2022

(51) Int. Cl.

| | |
|---|---|
| ***G09G 3/00*** | (2006.01) |
| ***G06T 19/00*** | (2011.01) |
| ***G03B 21/62*** | (2014.01) |
| ***G02B 30/56*** | (2020.01) |

(52) U.S. Cl.
CPC ............. *G09G 3/003* (2013.01); *G02B 30/56* (2020.01); *G03B 21/62* (2013.01); *G06T 19/006* (2013.01); *G09G 3/002* (2013.01)

(58) Field of Classification Search
CPC ........ G09G 3/003; G09G 3/002; G06F 3/011; G06F 3/0346; G06F 3/0426; G06F 3/0428; G06F 3/04886; G02B 30/56; G03B 21/62; G06T 19/006
See application file for complete search history.

(56) References Cited

U.S. PATENT DOCUMENTS 6,064,423 A 5/2000 Geng
7,833,106 B2 11/2010 Zhu
8,489,569 B2 7/2013 Kirk
8,506,396 B1 8/2013 Snyder
9,501,857 B2 * 11/2016 Itoh ........................ G09G 3/003
10,223,605 B2 * 3/2019 Tyson .................. G06V 30/224
10,368,061 B2 7/2019 Colosimo
10,554,961 B2 2/2020 Vora
D879,386 S 3/2020 Lin
2017/0270712 A1 * 9/2017 Tyson ................ H04N 1/00204
2022/0293067 A1 * 9/2022 Hayashi ................. G06V 20/50

FOREIGN PATENT DOCUMENTS

WO WO2020206237 10/2020

* cited by examiner

*Primary Examiner* — Vijay Shankar

(57) ABSTRACT

A virtual fish tank assembly for displaying three dimensional aquatic creatures includes a housing structure. The housing structure is positioned adjacent to a fish tank. A projector is coupled to an interior space of housing structure. A control module is in electric communication with the projector. The control module obtains data from a user, reads the data, and generates a plurality of three dimensional images. A power source is in electric communication with the projector and with the control module. The power source provides power to the projector and to the control module. A screen has a peripheral surface and a back surface. The peripheral surface attaches to a respective one wall of the plurality of walls of the fish tank. The screen displays the three dimensional figures projected from the projector to give the appearance of the figures being within the fish tank.

12 Claims, 5 Drawing Sheets

52
40
40
40
40
40
40
38
36
22

VIRTUAL FISH TANK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to simulated fish tank assemblies and more particularly pertains to a new simulated fish tank assembly for displaying three dimensional aquatic creatures.

(2) Description of Related Art including information disclosed under 37 CFR 1.97 and 1.98

The prior art relates to simulated fish tank assemblies. The prior art includes a variety of digital projectors configured for projecting three dimensional figures. The prior art further comprises simulated aquariums, wherein a plurality of virtual aquatic animals are displayed. Known prior art lacks a simulated fish tank assembly including a projection screen mounted within a fish tank to display images of aquatic animals from a digital projector mounted adjacent to the projection screen.

(h) BRIEF SUMMARY OF THE INVENTION

An embodiment of the disclosure meets the needs presented above by generally comprising a housing structure having a rectangular base. The housing structure is positioned adjacent to a fish tank. A projector is coupled to the rectangular base of housing structure. A control module is in electric communication with the projector. The control module is a central processing unit. The central processing unit has a receiver. The receiver obtains data from a user wherein the data is an input command. The central processing unit reads the data and generates a plurality of three dimensional images. The plurality of three dimensional images is projected from the projector. A power source is in electric communication with the projector and with the control module. The power source provides power to the projector and to the control module. A screen has a peripheral surface and a back surface. The peripheral surface is an adhesive material. The peripheral surface attaches to a respective one wall of the plurality of walls of the fish tank. The screen is proximate to the housing structure. The screen displays the three dimensional images projected from the projector to give the appearance of the plurality of three dimensional images being within the fish tank.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
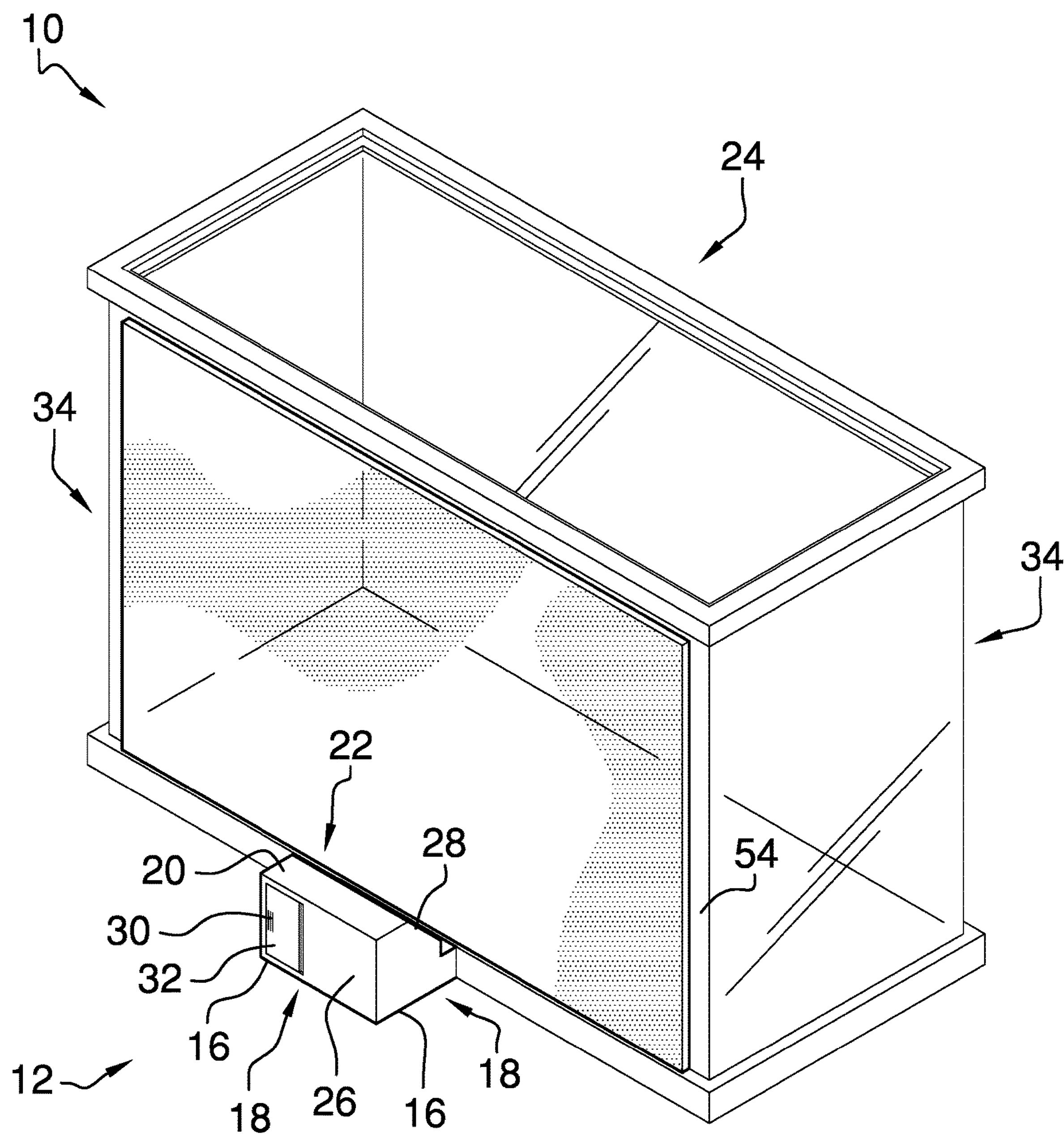
FIG. 1 is an isometric view of a virtual fish tank according to an embodiment of the disclosure.
Figure 2:
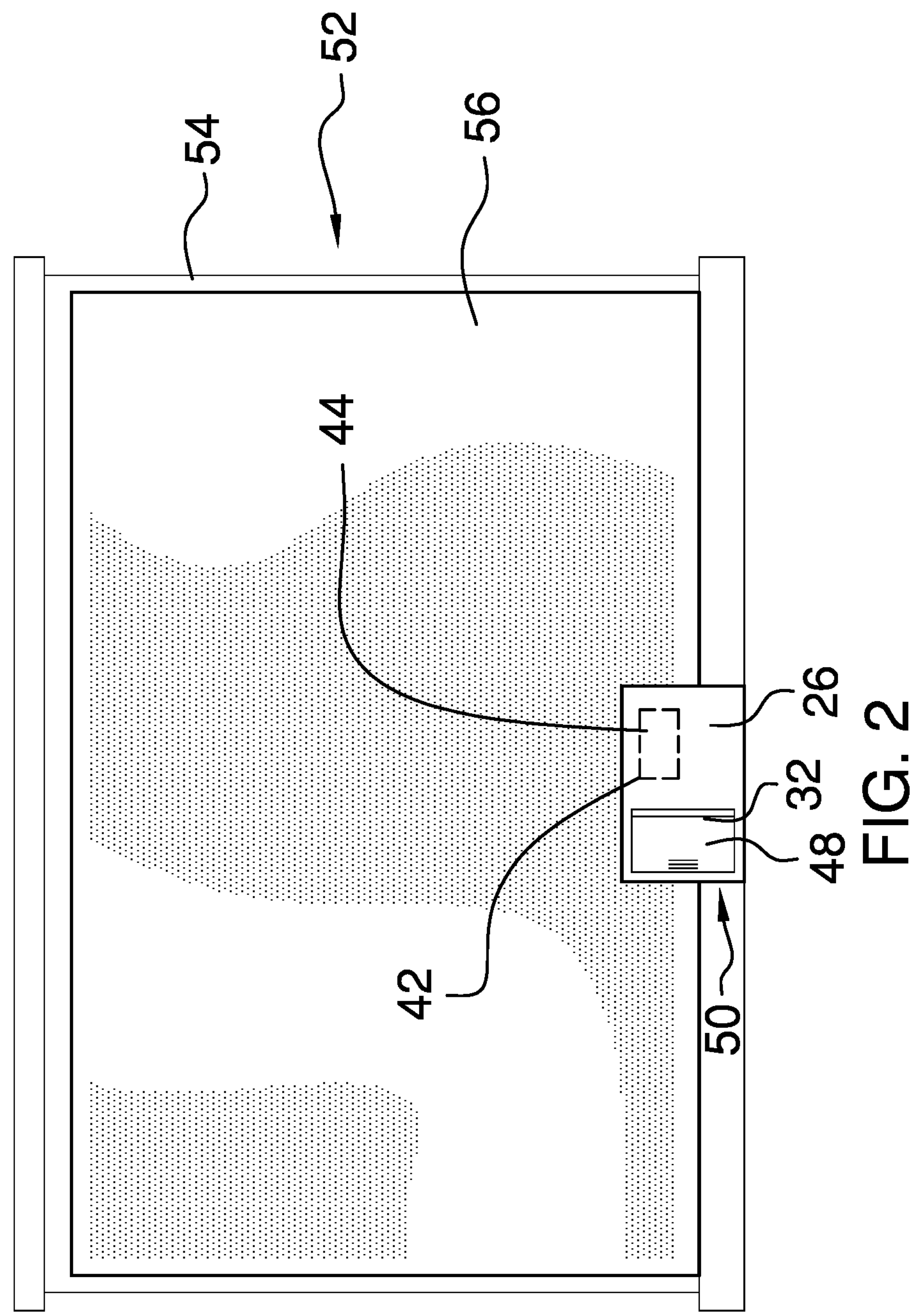
FIG. 2 is a back view of an embodiment of the disclosure.
Figure 3:
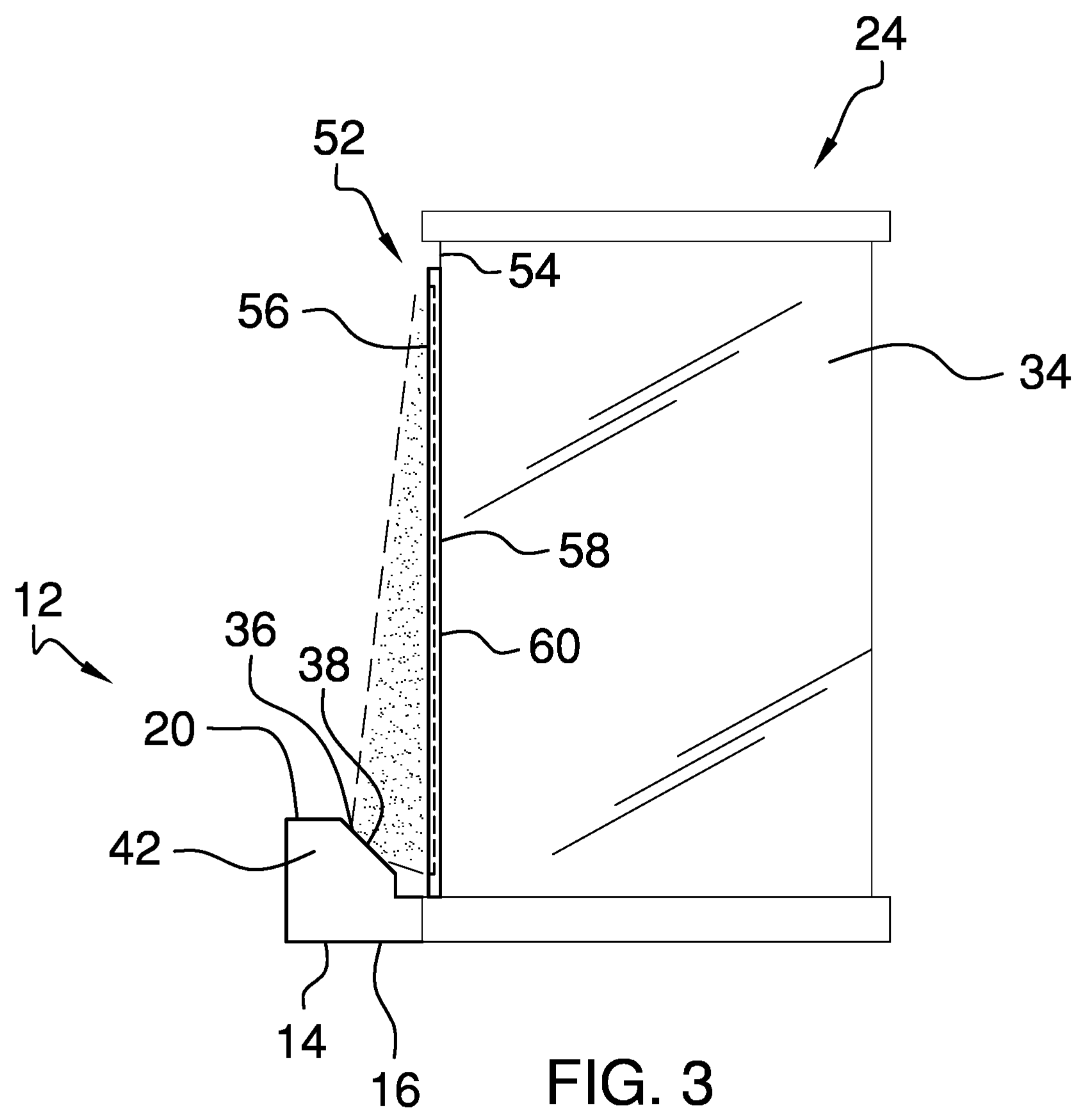
FIG. 3 is a side view of an embodiment of the disclosure.
Figure 4:
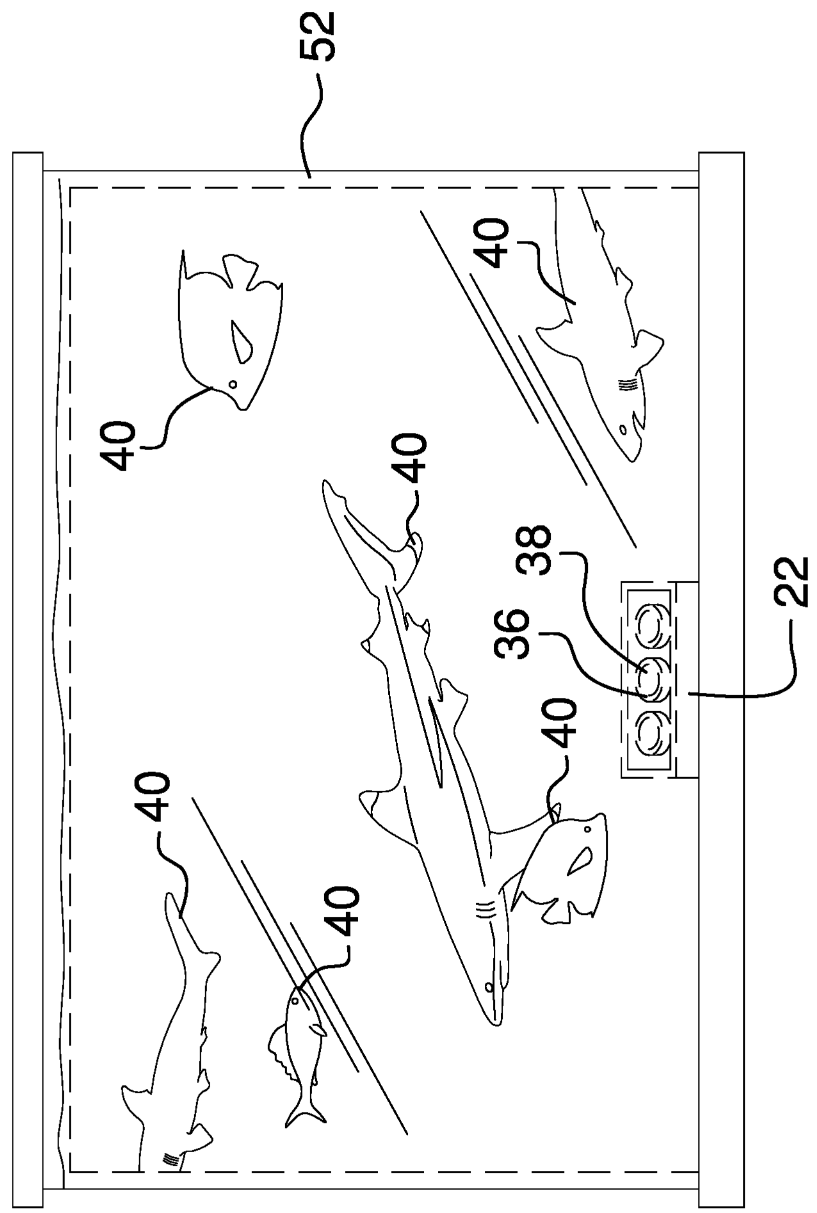
FIG. 4 is a front in-use view of an embodiment of the disclosure.
Figure 5:
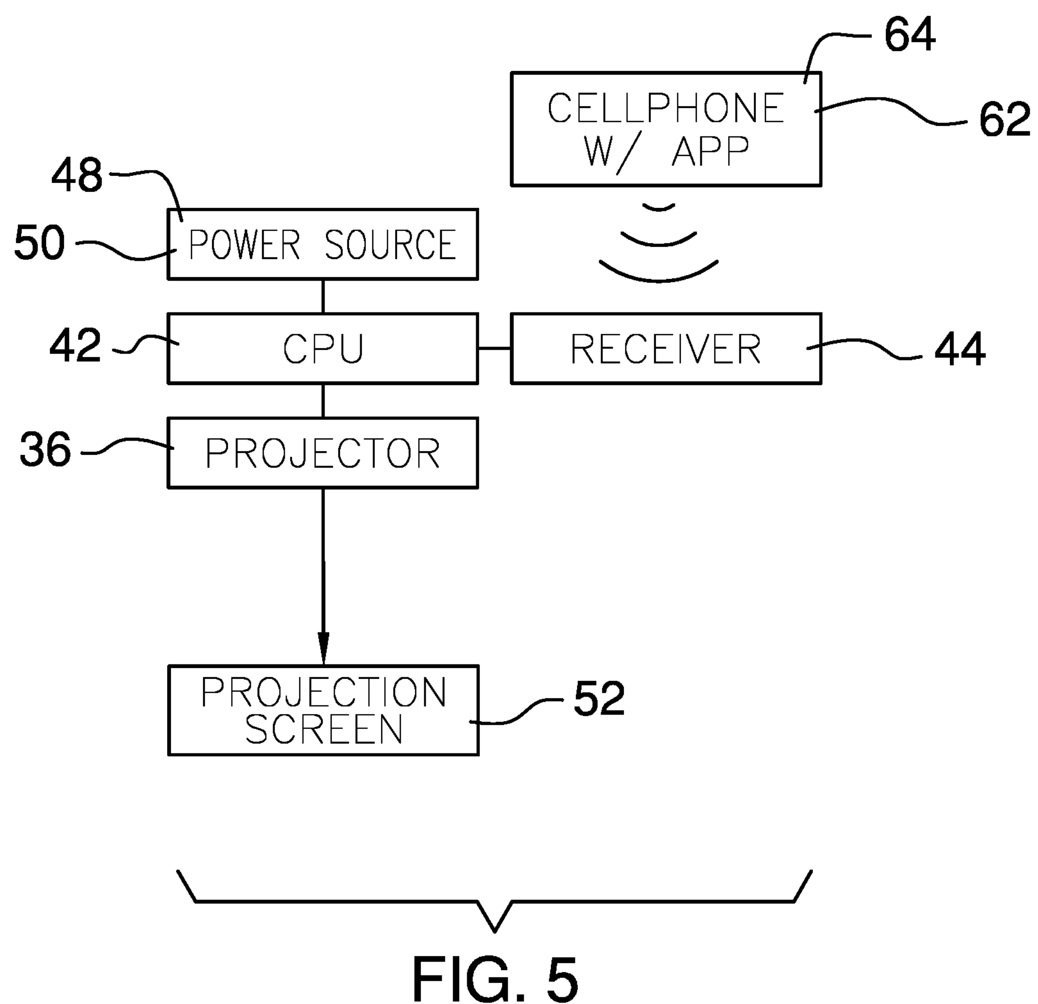
FIG. 5 is a block diagram view of an embodiment of the disclosure.

With reference now to the drawings, and in particular to FIGS. 1 through 5 thereof, a new simulated fish tank assembly embodying the principles and concepts of an embodiment of the disclosure and generally designated by the reference numeral 10 will be described.

As best illustrated in FIGS. 1 through 5, the virtual fish tank 10 generally comprises a housing structure 12. The housing structure 12 has a rectangular base 14. The rectangular base 14 has a plurality of edges 16. A plurality of walls 18 is coupled to a respective one of the plurality of edges 16. A roof 20 is coupled to the plurality of walls 18. The roof 20 is parallel relative to the rectangular base 14. The plurality of walls 18 in combination with the roof 20 and the rectangular base 14 define an interior space 22.

The housing structure 12 is positioned adjacent to a fish tank 24. The housing structure 12 has an exposed face 26 and an adjacent face 28. The exposed face 26 is distal relative to the fish tank 24, and the adjacent face 28 is proximal relative to the fish tank 24. The exposed face 26 has a battery compartment 30. A battery compartment door 32 is coupled to the exposed face 26 to shield the battery compartment 30. The adjacent face 28 is transparent. The fish tank 24 is a rectangular structure comprising of a plurality of transparent walls 34. Each wall of the plurality of transparent walls 34 is a transparent material.

A projector 36 is coupled to the rectangular base 14 within the interior space 22 of the housing structure 12. A lens 38 is coupled to the projector 36. The lens 38 is positioned facing the adjacent face 28 of the housing structure 12. The lens 38 is positioned to face up at an angle towards the fish tank 24. The lens 38 protrudes a plurality of three dimensional images 40 from the projector 36.

A control module 42 is coupled to the interior space 22 of the housing department 12 and is in electric communication with the projector 36. The control module 42 has a cube shaped body coupled to the projector 36. The control module 42 has a receiver 44. The receiver 44 obtains a data 46 from a user. The data 46 is an input command 47. The control module 42 reads the data 46 and produces the plurality of three dimensional images 40.

A power source 48 comprising of a plurality of batteries 50 is positioned in the battery compartment 30. The power source 48 is in electric communication with the control module 42 and the projector 36. The power source 48 provides power to the control module 42 and to the projector 36.

A screen 52 is coupled to an interior wall 54 of the plurality of transparent walls 34 of the fish tank 24. The interior wall 54 of the plurality of transparent walls 34 is positioned proximate to the housing structure 12. The screen has an attachment surface 56 and a peripheral surface 58. The attachment surface 56 is an adhesive material 60. The attachment surface 56 is configured for coupling to the interior wall 54. The screen 52 displays the plurality of three dimensional images 40 projected from the lens 38 of the projector 36. The screen 52 displays the three dimensional images 40 to give the appearance of being within the fish tank 24.

In use, the user sends an input command 47 to the receiver 44 of the control module 42. The input command 47 is sent from an application 62 on a mobile device 64. The receiver 44 obtains the input command 47 and sends the input command 47 to the control module 42. The control module 42 processes the input command 47 and produces the plurality of three dimensional images 40. The control module 42 sends the plurality of three dimensional images 40 to the projector 36.

The plurality of three dimensional images 40 is projected through the lens 38 of the projector 36 onto the screen 52. The screen 52 displays the three dimensional images 40 to give the appearance of the plurality of three dimensional images 40 being within the fish tank 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A virtual projected aquarium assembly comprising:

a housing structure, said housing structure having a rectangular base, said rectangular base having a rectangular shape, said base having a plurality of edges, a plurality of walls are coupled to a respective one of said plurality of edges, said housing structure has a roof, said roof being parallel to said rectangular base, said roof being coupled to said plurality of walls, said plurality of walls in combination with said rectangular base and said roof define an interior space, said house structure positioned adjacent to and abutting a fish tank, said housing structure having a exposed face and an adjacent face, said exposed face and said adjacent face being parallel relative to each other, said exposed face is positioned distal relative to said fish tank and said adjacent face being positioned proximate relative to said fish tank, said exposed face having a battery compartment, said battery compartment having a door coupled to said exposed surface, said adjacent face being transparent, said fish tank having a rectangular structure, said rectangular structure comprising of a plurality of walls;

a projector, said projector being a digital projector, said projector having a base, said base of said projector being coupled to said rectangular base positioned in said interior space of said house structure, a lens being coupled to said projector, said lens of said projector being positioned facing said adjacent face of said housing structure, said lens of said projector positioned facing up at an angle towards said fish tank;

a control module, said control module being a central processing unit, said control module having a body, said body being a cube shape, said central processing unit being coupled to said projector, said control module being coupled to said rectangular base positioned in said interior space, said central processing unit being in electric communication with said projector, said central processing unit having a receiver, said receiver being configured for obtaining a data from a user wherein the data is a input command, said central processing unit being configured for reading the data and generating the plurality of three dimensional images wherein the plurality of three dimensional images are projected from said projector;

a power source, said power source being a plurality of disposable batteries, said power source being coupled to said projector, said power source being in a electric communication with said projector and with said control module, said power source provides power to said projector and to said control module; and a screen, said screen being a translucent screen, said screen having a peripheral surface and an attachment surface, said attachment surface being an adhesive material, said attachment surface being configured for attaching to a respective one wall of said plurality of walls of said fish tank, said screen being proximate to said housing structure, said screen being configured for displaying a three dimensional figure projected from said projector to give the appearance of the three dimensional figure being within said fish tank.

2. A virtual projected aquarium assembly comprising:

a housing structure, said housing structure having a rectangular base, said house structure positioned adjacent to and abutting a fish tank;

a projector, said projector having a base, said base of said projector being coupled to said rectangular base positioned in said interior space of said house structure;

a control module, said control module being a central processing unit, said central processing unit being in electric communication with said projector, said. central processing unit having a receiver, said receiver being configured for obtaining a data from a user wherein the data is a input command, said central processing unit being configured for reading the data and generating the plurality of three dimensional images wherein the plurality of three dimensional images are projected from said projector;

a power source, said power source being in electric communication with said projector and with said control module, said power source provides power to said projector and to said control module; and a screen, said screen having a peripheral surface and an attachment surface, said attachment surface being an adhesive material, said attachment surface being configured for attaching to a respective one wall of said plurality of walls of said fish tank, said screen being proximate to said housing structure, said screen being configured for displaying a three dimensional figure projected from said projector to give the appearance of the three dimensional figure being within said fish tank.

3. The virtual projected aquarium assembly of claim 2, further comprising said rectangular base having a rectangular shape, said rectangular base having a plurality of edges, a plurality of walls are coupled to a respective one of said plurality of edges, said housing structure has a roof, said roof being parallel to said rectangular base of said housing structure, said roof being coupled to said plurality of walls.

4. The virtual projected aquarium assembly of claim 3, further comprising said plurally of walls in combination with said rectangular base and said roof define an interior space.

5. The virtual projected aquarium assembly of claim 3, further comprising said housing structure having a exposed face and an adjacent face, said exposed face and said adjacent face being parallel relative to each other, said exposed face is positioned distal relative to said fish tank and said adjacent face being positioned proximate relative to said fish lank, said exposed face having a battery compartment, said battery compartment having a door coupled to said exposed surface, said adjacent face being transparent.

6. The virtual projected aquarium assembly of claim 2, further comprising said fish tank having a rectangular structure, said rectangular structure comprising of a plurality of walls.

7. The virtual projected aquarium assembly of claim 2, further comprising said projector being a digital projector.

8. The virtual projected aquarium assembly of claim 2, further comprising said base of said projector coupled to said rectangular base being positioned in said interior space of said house structure.

9. The virtual projected aquarium assembly of claim 2, further comprising a lens being coupled to said projector, said lens of said projector being positioned facing said adjacent face of said housing structure, said lens of said projector positioned facing up at an angle towards said fish lank.

10. The virtual projected aquarium assembly of claim 2, further comprising said control module having a body, said body being a cube shape, said central processing unit being coupled to said projector, said control module being coupled to said rectangular base positioned in said interior space.

11. The virtual projected aquarium assembly of claim 2, further comprising said power source being a plurality of disposable batteries, said power source being coupled to said projector, said plurality of disposable batteries being stored in said battery compartment.

12. The virtual projected aquarium assembly of claim 2, further comprising said screen being a translucent screen.

* * * * *